Aug. 14, 1928.

J. C. WOODSON 1,680,404

HEATING UNIT

Filed May 11, 1927

WITNESSES:

INVENTOR
James C. Woodson.
BY
ATTORNEY

Patented Aug. 14, 1928.

1,680,404

UNITED STATES PATENT OFFICE.

JAMES C. WOODSON, OF MANSFIELD, OHIO, ASSIGNOR TO WESTINGHOUSE ELECTRIC & MANUFACTURING COMPANY, A CORPORATION OF PENNSYLVANIA.

HEATING UNIT.

Application filed May 11, 1927. Serial No. 190,415.

My invention relates to electrical heaters and more particularly to an electrical resistance heating element adapted to be mounted in an oven to effect the heating thereof.

An object of my invention is to provide an encased heating element which may be readily taken apart for the purpose of inspection and renewal of the resistance heating element.

Another object of my invention is to provide an improved resistor supporting means whereby the resistor and support may be withdrawn as a unit from the encasing member.

Another object of my invention is to provide an encased heating element wherein the resistor is preformed to provide a greater heating except adjacent to the ends of the casing to compensate for oven side-wall heat losses.

In practicing my invention, I provide a tubular casing permanently closed at one end thereof and provided at the other end with a removable closure plate upon which are mounted electric terminals for the resistor element.

Within the casing is mounted a plurality of resistor-supporting means maintained in spaced relation by means secured to the removable closure plate whereby the closure plate, resistor and resistor supports may be removed as a unit from the casing. With relatively wide ovens, considerable heat loss is experienced through the side walls thereof, but with the heating element mounted transversely of the oven chamber, compensation for such losses is made by providing increased resistor area or length within the casing adjacent to the ends thereof.

In the drawings, Figure 1 is a partial view, in elevation, of a heating unit embodying my invention, with the casing thereof shown in section:

Figure 1:
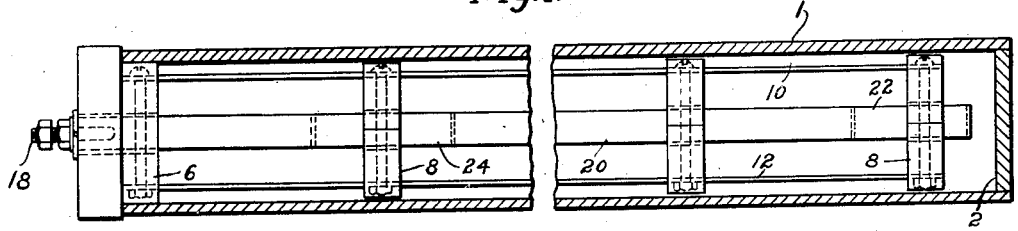
Figure 2:
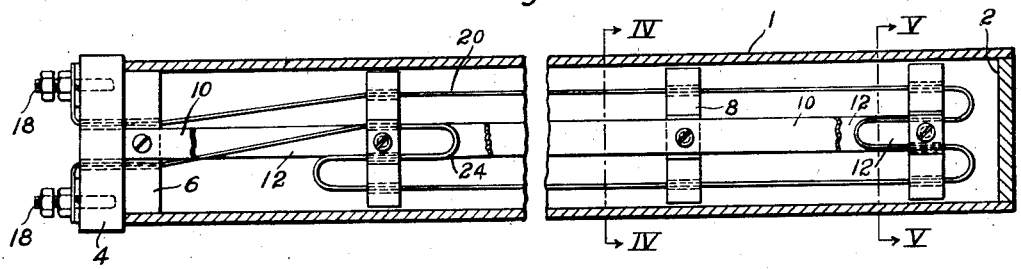
Fig. 2 is a plan view of the heater shown in Fig. 1.
Figure 3:
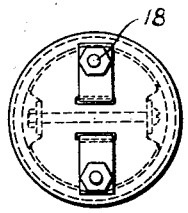
Fig. 3 is an end elevation of the heater as shown in Fig. 2.
Figure 4:
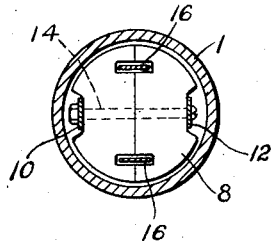
Fig. 4 is a section on the line IV—IV of Fig. 2.
Figure 5:
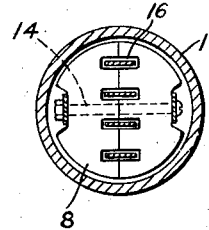
Fig. 5 is a section on the line V—V of Fig. 2.

Referring more particularly to the drawings, a heating unit embodying my invention comprises a tubular casing 1, which may be of metal, closed permanently at one end by a disc 2.

The opposite end of the casing is closed by a removable refractory plate 4 having a reduced portion 6 fitting tightly in the end of the tubular casing.

Within the casing and spaced longitudinally thereof are a plurality of split discs 8, of suitable refractory insulating material, for supporting a resistor heating element. The discs are maintained in spaced relation by strips 10 and 12 secured in recesses in the sides of the discs by bolts 14 extending therethrough, and said strips are secured at one end to the closure plate 4 in recesses formed in the reduced portion 6 thereof.

The discs are slit radially to provide two semicircular portions with the cooperating faces thereof slotted, as at 16, parallel to the axis of the disc, to provide apertures for the reception of convolutions of a resistor heating element 20 when the discs are assembled.

The resistor 20 comprises in the present embodiment, a preformed convolution of suitable resistance ribbon, such as nichrome with the terminals thereof extending through the closure plate 4 and electrically connected with terminals 18 mounted thereon. The resistor convolution is substantially co-extensive in overall-length with the interior of the casing and is provided, adjacent to the ends of the casing, with return-bent portions 22 and 24, thereby forming a greater heating area adjacent the ends than at the intermediate portion thereof.

In assembling the device, the resistor supporting discs 8 are spaced along the length of the resistor with portions of the resistor received in the apertures in the discs, formed by the cooperating slots 16. The discs are clamped in supporting and spacing position by the bolts 14 extending radially therethrough. The supporting strips 10 and 12 are secured to the discs 8 by means of the clamping bolts 14, thereby maintaining said discs in spaced relation. The ends of the strips 10 and 12 are secured to the reduced portion 6 of the removable closure plate 4 and the terminals of the resistor 20 are extended through suitable apertures in plate 4 and connected with the terminals 18. The plate 4, the resistor, and resistor supports are then inserted as a unit into the casing.

The assembled heating element is then suitably mounted in an oven chamber (not shown) to extend between and the terminals 18 connected to a suitable source of electrical power.

The resistor 20 has been shown and described as a flat ribbon, but it is obviously within the scope of my invention to employ resistors variously shaped in cross-section if desired.

It is also obviously within the scope of my invention to form the return-bent portions at any desired points along the length of the casing to provide relatively high temperature zones at said points.

My invention thus provides a compact heating element which may be easily taken apart for purposes of inspection or renewal of parts, and by preforming the resistor as desired, variation in the amount of heat generated along the length of the casing is effected.

Modifications may be made without departing from the spirit and scope of my invention, and I desire therefore that only such limitations shall be placed thereon as are imposed by the prior art or are set forth in the appended claims.

I claim as my invention:

1. In an encased heating element, the combination with a tubular casing and removable means for closing one end thereof, a resistance heating element substantially coextensive in over-all length with the interior of said casing and preformed to provide a greater heating surface adjacent the ends of said casing than at the center thereof, means carried by said removable closure means and removable therewith for supporting said resistor in spaced relation with the walls of said casing, said means comprising a plurality of spaced discs of refractory electric insulating material slotted to receive the resistor, a supporting strip having one end secured to the closure means, and bolts extending through the respective split discs and the supporting strip to clamp them together.

2. An encased heating element comprising a convolution of resistor ribbon and return-bent portions adjacent the ends thereof to provide increased heating areas thereat, a plurality of split discs spaced along said resistor convolution and slotted to receive said ribbon, a tubular casing for said resistor substantially coextensive in length with the length of said convolution and coextensive in internal diameter with the diameter of said discs, a removable closure for an end of said casing, terminal means thereon for the terminals of said ribbon, and means carried by said closure for supporting said discs in spaced relation perpendicular to the area of said casing.

3. In an encased tubular electric heating element, in combination, a tubular metal casing, a removable closure member in one end thereof, a pair of supporting strips having one end secured to the closure member and extending in the casing, a plurality of split discs of refractory material having slots in their adjacent faces, and a resistor member comprising a convolution extending substantially the entire length of the tubular casing and return bent portions adjacent to the ends of the casing, the resistor member being received in and held by the slotted split discs.

In testimony whereof, I have hereunto subscribed my name this 29 day of April, 1927.

JAMES C. WOODSON.